(12) United States Patent
Pino

(10) Patent No.: US 9,193,400 B2
(45) Date of Patent: Nov. 24, 2015

(54) DEVICE FOR LIFTING AND LOWERING THE SPARE WHEEL OF A VEHICLE

(75) Inventor: Nicola Giorgio Pino, Caserta (IT)

(73) Assignee: PROMA SPA, S. Nicola La Strada (CE) (IT)

( * ) Notice: Subject to any disclaimer, the term of this patent is extended or adjusted under 35 U.S.C. 154(b) by 171 days.

(21) Appl. No.: 14/001,836

(22) PCT Filed: Feb. 13, 2012

(86) PCT No.: PCT/IB2012/000252
§ 371 (c)(1),
(2), (4) Date: Nov. 4, 2013

(87) PCT Pub. No.: WO2012/117279
PCT Pub. Date: Sep. 7, 2012

(65) Prior Publication Data
US 2014/0044509 A1    Feb. 13, 2014

(30) Foreign Application Priority Data
Feb. 28, 2011 (IT) .................................. TO11A0172

(51) Int. Cl.
*B62D 43/02* (2006.01)
*B66D 1/02* (2006.01)
*B62D 43/04* (2006.01)

(52) U.S. Cl.
CPC .................................. *B62D 43/045* (2013.01)

(58) Field of Classification Search
CPC ...... B62D 43/045; B62D 43/04; B62D 43/00; B66D 5/34; B66D 1/06; B66D 1/54
USPC ................. 188/69; 192/19; 224/42.21, 42.23, 224/42.24, 42.25; 242/298; 254/323, 375, 254/376; 414/463, 466; 70/259; 74/55, 575, 74/577 M, 577 R, 577 S
See application file for complete search history.

(56) References Cited

U.S. PATENT DOCUMENTS

| | | | | |
|---|---|---|---|---|
| 3,856,167 A | * | 12/1974 | Yasue et al. | 414/463 |
| 3,865,264 A | * | 2/1975 | Kuhns | 414/463 |
| 5,100,106 A | * | 3/1992 | Denman et al. | 254/323 |
| 6,554,253 B1 | * | 4/2003 | Dobmeier et al. | 254/323 |
| 6,561,489 B1 | | 5/2003 | Wakefield et al. | |
| 2004/0188582 A1 | | 9/2004 | Flynn et al. | |
| 2005/0133550 A1 | * | 6/2005 | Pino | 224/42.12 |
| 2010/0143085 A1 | * | 6/2010 | Tarabuso et al. | 414/463 |

FOREIGN PATENT DOCUMENTS

GB       1 422 000       1/1976

OTHER PUBLICATIONS

International Search Report for International Application No. PCT/IB2012/000252 mailed May 14, 2012 (2 pages).

* cited by examiner

*Primary Examiner* — Gregory Adams
(74) *Attorney, Agent, or Firm* — Merchant & Gould P.C.

(57) ABSTRACT

A device for lifting and lowering the spare wheel R of a vehicle includes an actuator 3, having an activation portion 31 and at least one flexible cable 2, operated through the actuator 3. A hooking element 5 is secured to one end of the flexible cable 2, for anchoring the wheel R in an adapted compartment 7. The device includes a safety device 4 which is adapted to signal to the user that the spare wheel has been successfully and properly anchored in the compartment 7.

9 Claims, 5 Drawing Sheets

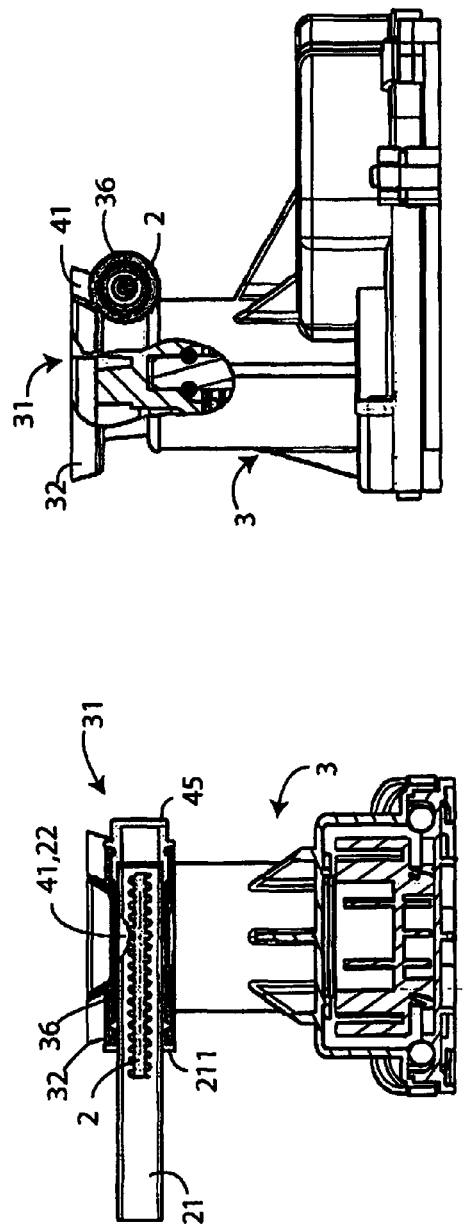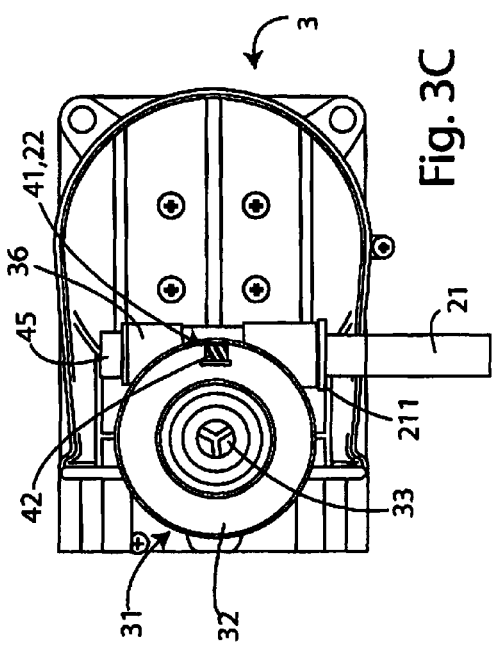
Fig. 3B
Fig. 3C
Fig. 3A

DEVICE FOR LIFTING AND LOWERING THE SPARE WHEEL OF A VEHICLE

This application is a National Stage Application of PCT/IB2012/000252, filed 13 Feb. 2012, which claims benefit of Serial No. TO2011A000172, filed 28 Feb. 2011 in 28 Feb. 2011 and which applications are incorporated herein by reference. To the extent appropriate, a claim of priority is made to each of the above disclosed applications.

BACKGROUND

The present invention relates to a device for lifting and lowering the spare wheel of vehicles such as cars and trucks, which comprises a safety device capable of generating a signal, e.g. a luminous one, which can be easily detected by the user, when the wheel has been properly secured in the lifting device.

Devices for lifting and lowering a spare wheel from/into the respective compartment in the vehicle are known which comprise an actuator, a flexible cable and a striker element for said wheel, connected to one end of said cable.

The actuator pulls the cable, so that the striker element, on which the wheel has been positioned, firmly anchors the wheel in the compartment or housing where it is normally located.

When one of the vehicle's wheels gets punctured, it must be replaced; once removed, the flat wheel must be placed into its housing.

It is normally difficult to verify if the wheel has been correctly positioned into its housing under the vehicle.

Improper anchorage may cause the spare wheel to fall over time, resulting in possible damage to the vehicle and to third parties, especially in the event that the wheel falls while the vehicle is moving.

Typically the system is operated mechanically by turning a wrench and pulling said flexible cable.

In such devices it is difficult to determine if the wheel has been lifted and anchored successfully.

The increasing effort required on the wrench for operating the actuator is not a sufficient indication that the spare wheel has been properly anchored in the correct position; in fact, in some cases the wheel may not be seated correctly and abut against the edges of the housing, so that it cannot be fully and properly inserted into its compartment.

In this incorrect position, the user will nevertheless perceive an increasing resistance when turning the wrench, which may be mistaken for the correct end-of-travel position of a properly seated wheel.

SUMMARY

The present invention aims at solving the above problems by providing a safety device adapted to signal to the user when the spare wheel has been successfully and properly anchored in its compartment, e.g. by means of a clearly visible signal that cannot be misinterpreted by the user.

One aspect of the present invention relates to a device for lifting and lowering a spare wheel.

BRIEF DESCRIPTION OF THE DRAWINGS

Further accessory features of the present invention are set out in dependent claims.

The features and advantages of the present device will become apparent from the following description of some embodiments thereof with reference to the annexed drawings, wherein:

FIGS. 3A, 3B and 3C show orthogonal-projection views of the actuator of FIG. 2;

FIG. 4A shows the end portion of the guide tube where the flexible cable slides; FIG. 4B shows the seal comprised in the activation portion of the actuator according to the present invention; FIG. 4C shows the closing element;

DETAILED DESCRIPTION

Figure 1:
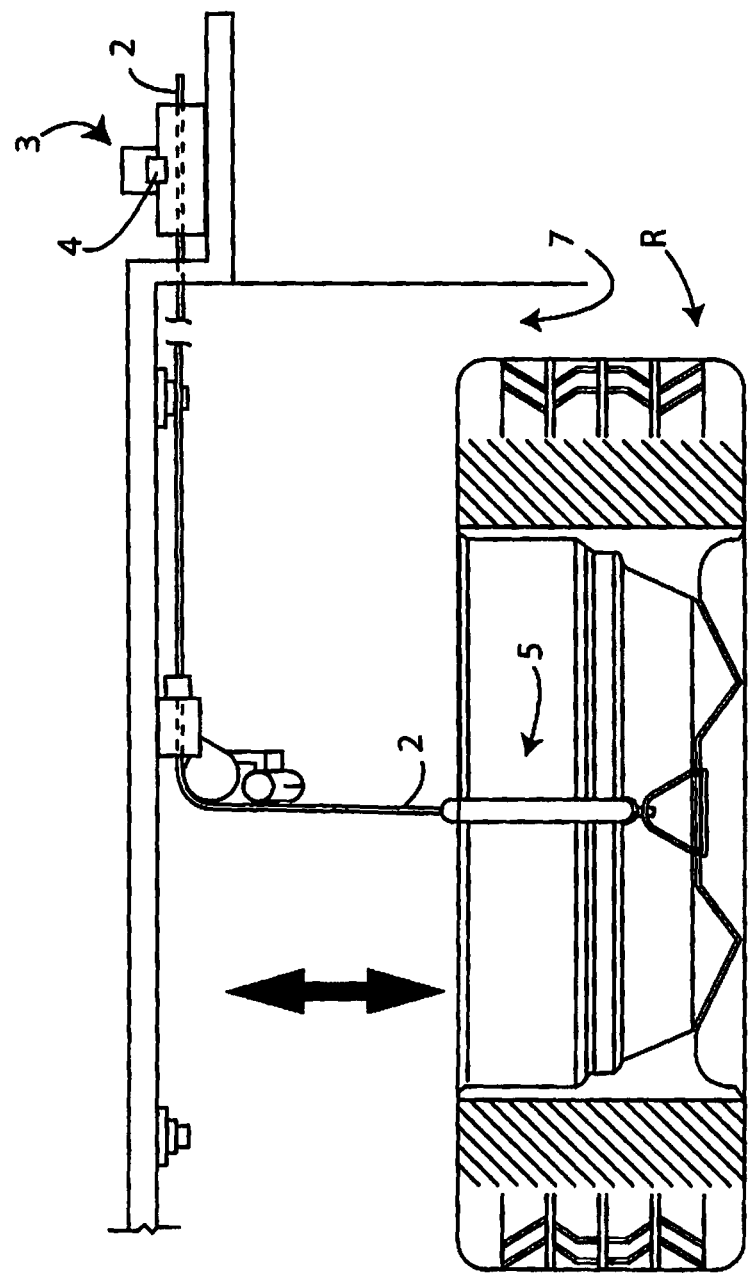
FIG. 1 shows one embodiment of the device for lifting and lowering a spare wheel.

With reference to the above-listed drawings, the device for lifting and lowering the spare wheel R of a vehicle comprises an actuator 3, preferably arranged in the boot of the vehicle, at least one flexible cable 2, operated through actuator 3, and a hooking element 5, secured to one end of flexible cable 2 and adapted to anchor wheel R in a suitable compartment 7, as shown in FIG. 1.

Said device further comprises a safety device 4 adapted to signal to the user that the spare wheel has been successfully and properly anchored in compartment 7.

Figure 2:
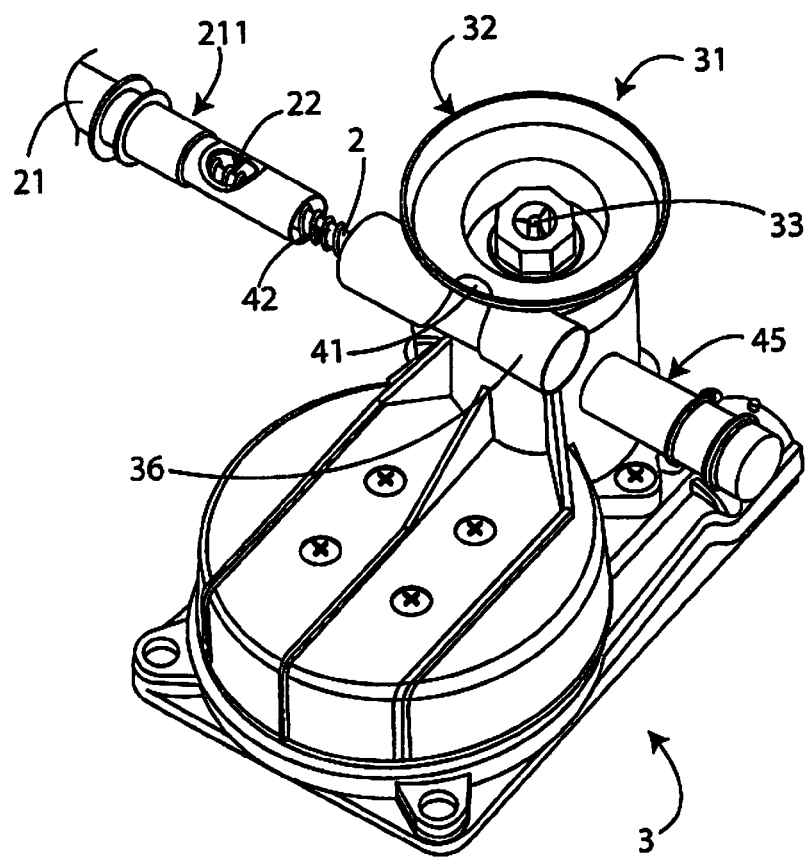
FIG. 2 shows a detail of the actuator comprising one embodiment of the safety device according to the present invention.

In the preferred embodiment shown in FIG. 2, actuator 3 comprises a plurality of mechanisms (not shown) adapted to move the cable; an activation portion 31, preferably arranged in a position which can be seen by the user when operating the device for lifting wheel R.

Said activation portion 31 comprises a protection cup or guard 32 adapted to insulate the mechanical portion of actuator 3, where there is an activation nut 33 which is mechanically connected to the plurality of mechanisms included in actuator 3 and with which a suitable wrench can be associated in order to operate actuator 3.

The concave shape of said cup 32 is such that it seals the activation portion of actuator 3 against external agents while allowing the activation nut to be turned by means of the wrench; this rotation allows actuator 3 to pull o release flexible cable 2 for lifting or lowering spare wheel R.

When wheel R is correctly secured in its compartment 7, said cable 2 is collected in a holder included, for example, in actuator 3.

Flexible cable 2, which is connected to wheel hooking element 5, slides within a guide tube 21, which is connected to cup 32 to allow cable 2 to slide to/from the holder.

In particular, said cup 32 comprises a fitting portion 36 into which said guide tube 21, where cable 2 can slide, is inserted.

Said fitting portion 36 preferably has a tubular shape and is positioned in the outer portion of cup 32, as shown in FIGS. 2, 3B, 3C and 4C.

In the preferred embodiment, as shown in FIGS. 2, 3A, 3B, 3C, 4A, 4B and 4C, safety device 4 comprises a slot or window 41 in fitting portion 36 of cup 32, where flexible cable 2 slides, so as to make cable 2 sliding therein visible; and a marking 41, e.g. a colored paint marking, on cable 2, which is adapted to signal the proper position of wheel R in compartment 7 when it matches window 41, thus being clearly visible to the user.

In the present embodiment, if wheel R is properly positioned, marking 42 will become visible through window 41 after removing the wrench from activation portion 31.

Figure 4A:
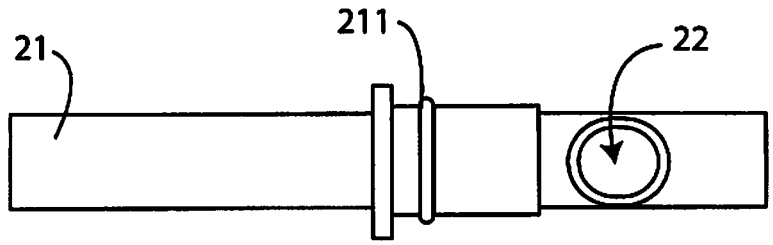
FIGS. 4A, 4B and 4C show some details of the device; in particular.

In particular, said tube 21 is connected to a first end of the tubular fitting portion 36, which tube 21 also comprises a window 22, which matches window 41 of safety device 4 when said tube 21 is properly inserted in fitting portion 36 of cup 32. A fastening portion 211 is adapted to ensure constant adhesion between tube 21 and fitting portion 36, as shown in FIG. 4A.

Figure 4B:
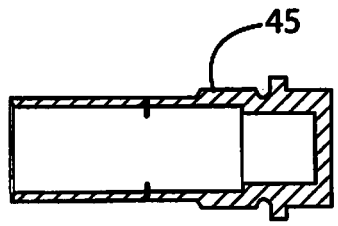
Figure 4C:
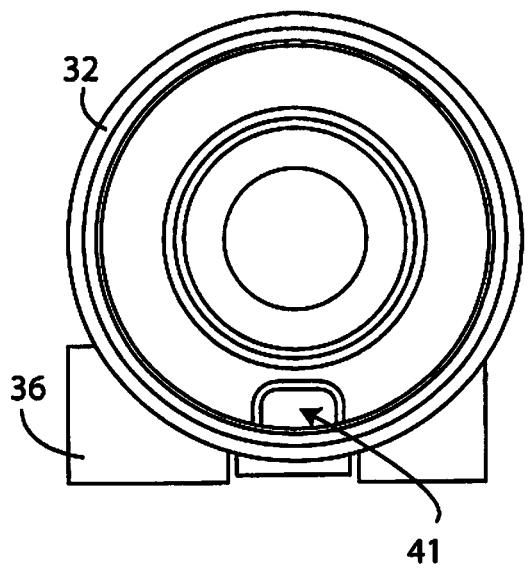

In the second end a closing element 45 is inserted, as shown in FIG. 4B, which comprises at least one transparent portion allowing visibility inside the tube and preventing dust and dirt from entering actuator 3, which might damage the mechanical components thereof, remove marking 42 from cable 2 or obstruct window 41, thus making it impossible for the user to verify the correct positioning of wheel R in compartment 7.

The transparent portion of closing element 45, when said element is positioned in fitting portion 36, matches and seals window 41 and window 22 on guide tube 21, thus preventing the entrance of dust and making cable 2 and marking 42 thereof visible to the user.

In an alternative embodiment (not shown), actuator 3 is activated by means of an electric nutrunner, which is associated with activation nut 33.

Said nutrunner is advantageously positioned near actuator 3, which is normally located in the vehicle's boot.

This alternative embodiment eliminates the need for manual wrench operation, thereby reducing the user's effort.

Figure 5:
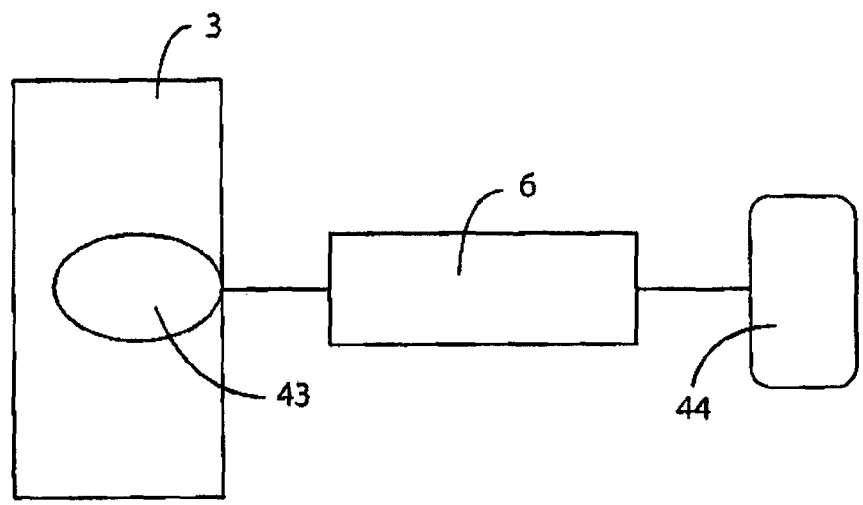
FIG. 5 is a block diagram of the embodiment of FIG. 5.
Figure 6:
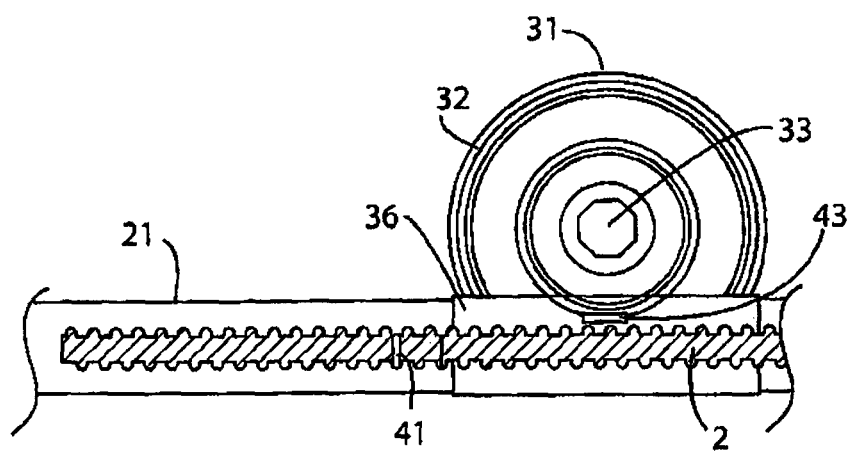
FIG. 6 shows a detail of the embodiment of FIG. 5.

In an alternative embodiment, shown in FIGS. 5 and 6, safety device 4 is implemented by using an electric circuit comprising a sensor 43, e.g. a proximity sensor, which is adapted to detect when cable 2 has been pulled to a height corresponding to the proper position of wheel R inside compartment 7.

As soon as said height is detected by sensor 43, a luminous and/or audible signaling device 44 is activated in order to signal to the user that wheel R has been properly positioned in the compartment.

Sensor 43 is arranged, for example, in fitting portion 36 whereto guide tube 21, in which cable 2 slides, is connected.

In a preferred embodiment, shown in FIG. 6, said sensor 43 is adapted to automatically detect the presence of a marking 42, e.g. made of magnetic material, which is adapted to energize sensor 43.

Sensor 43 and signaling device 44 are electrically connected to an electronic circuit 6 cooperating with the electric/electronic circuit of the vehicle, for monitoring and controlling said electronic devices.

The embodiment shown in FIG. 6 requires no slot or window 41 on guard 32, because the user is not required to monitor the presence of marking 42 in window 41, since this task is automatically carried out by the electronic circuit 6 that controls and monitors sensor 43.

Said signaling device 44 is preferably positioned in a place where it can be clearly seen by the user, e.g. in the boot or on the instrument cluster of the vehicle, especially if the actuation areas are not easily accessible.

For example, said signaling device 44 is of the luminous type, preferably a LED indicator light, which will only come on when wheel R is properly positioned in the compartment.

Said luminous signaling device 44 may, for example, blink at a low frequency, e.g. at a frequency between 0.2 and 2 Hz, in order to be clearly visible and immediately attract the user's attention.

In an alternative embodiment (not shown), signaling device 44 comprises, as an alternative to or in combination with the visual signaling, an audible signaling, e.g. provided by means of a buzzer, which is adapted to generate a sound and to repeat it for a predetermined period of time, not longer than one minute, to indicate to the user that wheel R has been properly positioned in compartment 7.

The present invention can be easily implemented at low cost, while making the operation of the safety device reliable and easy to comprehend for the user.

The invention claimed is:

1. Device for lifting and lowering the spare wheel of a vehicle comprising:
   an actuator, comprising an activation portion;
   at least a flexible cable, operated through the actuator;
   a hooking element, fixed at an end of the flexible cable, for anchoring the wheel in a suitable room;
   said device comprising a safety device for signaling to the user the occurred anchoring, in a correct way, of the spare wheel in the suitable room,
   wherein
   said safety device comprises a slot or window, in correspondence to the actuator, in such a way to make the cable visible and a marking on the cable, for signaling the correct positioning of the wheel inside the suitable room, when the marking is in correspondence to the window,
   the activation portion comprises a protection cup or guard including an activation nut and the window of the safety device, and
   said cup comprises a clutch portion; in a first end of said clutch portion is inserted a guide tube, where the cable can slide, the tube comprising a second window which coincides with the window of the safety device when said tube is correctly inserted in the clutch portion through a fixing portion.

2. The device according to claim 1, wherein in a second end of the clutch portion, is inserted a closing element, comprising at least a transparent portion for permitting visibility inside the tube and to prevent dust and dirt to enter both in the actuator, and to remove the marking on the cable.

3. The device according to claim 1, wherein the safety device comprises an electronic sensor, for detecting if the cable has been recovered up to a height corresponding to the correct positioning of the wheel inside the room, and a signaling device for signaling to the user the correct positioning of the wheel inside the room.

4. The device according to claim 3, wherein the activation portion comprises a guard, comprising a clutch portion, where the flexible cable slides, wherein the sensor is positioned.

5. The device according to claim 4, wherein the sensor is a proximity sensor for detecting automatically the presence of a marking, excite the sensor.

6. The device according to claim 3, wherein the sensor and the signaling device are electrically connected to an electronic circuit, cooperating with the electric/electronic circuit of the vehicle, for monitoring and controlling said electronic devices.

7. The device according to claim 6, wherein the signaling device is luminous.

8. The device according to claim 5, wherein the sensor and the signaling device are electrically connected to an electronic circuit, cooperating with the electric/electronic circuit of the vehicle, for monitoring and controlling said electronic devices.

9. The device according to claim 8, wherein the signaling device is luminous.

* * * * *